(12) United States Patent
Sienkowski et al.

(10) Patent No.: US 7,955,744 B2
(45) Date of Patent: Jun. 7, 2011

(54) METHOD FOR FUEL CELL START-UP WITH UNIFORM HYDROGEN FLOW

(75) Inventors: Jon R. Sienkowski, Rochester, NY (US); Balasubramanian Lakshmanan, Pittsford, NY (US); Daniel J. Darga, Victor, NY (US); John P. Salvador, Penfield, NY (US)

(73) Assignee: GM Global Technology Operations LLC, Detroit, MI (US)

(*) Notice: Subject to any disclaimer, the term of this patent is extended or adjusted under 35 U.S.C. 154(b) by 733 days.

(21) Appl. No.: 11/762,845

(22) Filed: Jun. 14, 2007

(65) Prior Publication Data

US 2008/0311437 A1 Dec. 18, 2008

(51) Int. Cl.
*H01M 8/06* (2006.01)

(52) U.S. Cl. ...................................... 429/429

(58) Field of Classification Search .................. None
See application file for complete search history.

(56) References Cited

U.S. PATENT DOCUMENTS

| | | | | |
|---|---|---|---|---|
| 5,023,150 A | * | 6/1991 | Takabayashi | 429/22 |
| 6,492,044 B1 | * | 12/2002 | Walsh | 429/13 |
| 6,706,430 B2 | * | 3/2004 | Wheat et al. | 429/13 |
| 7,371,477 B2 | * | 5/2008 | Yamamoto et al. | 429/415 |
| 7,436,148 B2 | * | 10/2008 | Saeki et al. | 320/104 |
| 7,491,455 B2 | * | 2/2009 | Skala | 429/415 |
| 2005/0118487 A1 | | 6/2005 | Whiton et al. | |
| 2005/0129990 A1 | * | 6/2005 | Ozeki et al. | 429/12 |
| 2005/0129999 A1 | * | 6/2005 | Geschwindt et al. | 429/22 |
| 2005/0208358 A1 | * | 9/2005 | Nishimura et al. | 429/34 |
| 2008/0008913 A1 | * | 1/2008 | Shimoi et al. | 429/17 |

FOREIGN PATENT DOCUMENTS

WO WO 2005/060021 A2 6/2005
WO WO 2005/060486 A3 7/2005

* cited by examiner

*Primary Examiner* — Melvin C Mayes
*Assistant Examiner* — Stefanie Cohen
(74) *Attorney, Agent, or Firm* — Fraser Clemens Martin & Miller LLC; J. Douglas Miller

(57) ABSTRACT

A fuel cell system is provided having a fuel cell stack including a plurality of fuel cells. The fuel cell system includes an anode supply manifold in fluid communication with the plurality of fuel cells, the anode supply manifold adapted to deliver a anode supply stream to the plurality of fuel cells; an anode exhaust manifold in fluid communication with the anodes of the plurality of fuel cells, the anode exhaust manifold adapted to receive an anode exhaust stream from the plurality of fuel cells; a first valve in fluid communication with the anode supply manifold; and a second valve in fluid communication with the anode exhaust manifold. A method of starting the fuel cell system is also provided. The fuel cell system and method militates against a non-uniform distribution of the anode supply stream to the anodes of the plurality of fuel cells.

9 Claims, 6 Drawing Sheets

METHOD FOR FUEL CELL START-UP WITH UNIFORM HYDROGEN FLOW

FIELD OF THE INVENTION

The present disclosure relates to a fuel cell system with substantially uniform hydrogen flow at start-up and a start-up method for the fuel cell system.

BACKGROUND OF THE INVENTION

Fuel cells have been proposed as a clean, efficient and environmentally responsible power source for electric vehicles and various other applications. In particular, fuel cells have been identified as a potential alternative for the traditional internal-combustion engine used in modern automobiles.

A fuel cell typically includes three basic components: a cathode, an anode and an electrolyte membrane. The cathode and anode typically include a finely divided catalyst, generally platinum, supported on carbon particles and mixed with an ionomer. The electrolyte membrane is sandwiched between the cathode and the anode to form a membrane-electrolyte-assembly (MEA). The MEA is typically disposed between porous diffusion media (DM) which facilitate a delivery of gaseous reactants such as hydrogen and oxygen to the cathode and anode. Hydrogen at the anode is converted to positively-charged hydrogen ions. These ions travel through the electrolyte to the cathode, where they react with oxygen. The oxygen can be supplied from air, for example. The remaining electrons in the anode flow through an external circuit to the cathode, where they join the oxygen and the hydrogen protons to form water.

Individual fuel cells can be stacked together in series to form a fuel cell stack. The fuel cell stack is capable of supplying a quantity of electricity sufficient to power a vehicle. During a typical start-up operation of the fuel cell stack, hydrogen enters and flows through the individual fuel cells from one end of the fuel cell stack to another. The ends of the fuel cell stack are often referred to as the wet and dry ends, with the hydrogen generally flowing from the wet end to the dry end. In this manner, hydrogen is distributed to the individual fuel cells in a sequential fashion, with delivery of the hydrogen to a portion of the fuel cells adjacent the wet end occurring first and delivery of the hydrogen to a portion of the fuel cells adjacent the dry end occurring last. Thus, the fuel cells at the dry end often receive hydrogen at a point in time after the fuel cells at the wet end receive hydrogen. In an alternate arrangement, hydrogen may also be fed from the dry end for regular operation and sometimes from both ends during startup. In all these cases there is a non-uniform distribution of hydrogen.

It is also well known in the art that high cell voltage combined with a hydrogen-air front passing through the cell results in cell voltage degradation induced by carbon corrosion. When hydrogen is received by the anodes of the fuel cells, the hydrogen replaces the air in the anodes and creates the hydrogen-air front that travels along a length of the anodes. In order to mitigate carbon corrosion during startup, a resistive load is typically placed across the stack to suppress cell voltage, thus reducing carbon corrosion. The lower the resistance, the lower the voltage during the hydrogen-air front.

Unfortunately, non-uniform distribution of hydrogen to the fuel cells during the start-up operation and the use of a resistive load can lead to a severe performance degradation of fuel cell stack. The presence of air on the cathodes coupled with the hydrogen-air front on the anodes can cause an undesirable electric potential to form. In particular, the non-uniform distribution of hydrogen on the anodes of the fuel cell stack can lead to a high potential phenomenon known as "cell reversal." Cell reversal occurs when a load is applied to the fuel cell stack and when at least one fuel cell in the fuel cell stack lacks hydrogen while other fuel cells in the fuel cell stack are supplied with hydrogen. Cell reversal causes an oxidation of fuel cell components and may result in a rapid voltage degradation of the fuel cell stack. In particular, a corrosion of the carbon substrate of the electrodes, wherein surface oxides, CO, and $CO_2$ are formed, occurs. The voltage degradation significantly reduces the useful life of the fuel cell stack.

A number of fuel cell systems and methods are known in the art for optimizing the distribution of hydrogen to the anodes of the fuel cell stack. For example, it is known in the art to purge the anodes of the fuel cell stack with hydrogen at system start-up so as to minimize a time that the hydrogen-air front exists in the flow channels of the anodes. It is also known to cause hydrogen to flow from both the first end and the second end of the fuel cell stack to optimize a distribution of hydrogen to the anode cells along a length of a fuel cell stack. Such a method has been found to result in the non-uniform distribution of hydrogen at the fuel cells disposed at the center of the fuel cell stack, however.

Geschwindt, et al., in U.S. Pub. Pat. App. No. 2005/0129999 reports an inlet fuel distributor having a permeable baffle disposed between a fuel supply pipe and a fuel inlet manifold, causing hydrogen to be uniformly distributed along the length of the fuel inlet manifold. During start-up, hydrogen or inert gas within the inlet fuel distributor and the fuel inlet manifold may be vented through a valve in response to a controller to present a uniform hydrogen front to the inlets of the fuel flow fields.

An independent supply of hydrogen to the anode cells has also been employed to minimize voltage degradation. For example, in U.S. Pub. Pat. App. No. 2005/0118487 to Whiton, et al., a fuel cell stack having an inlet fuel distributor including a plurality of conduits of substantially equal length and equal flow cross section is described. The fuel cell stack is reported to uniformly distribute fuel cell inlet fuel from a fuel supply pipe to a fuel inlet manifold. The conduits may be either channels formed within a plate or tubes and may have single exits or double exits into the fuel inlet manifold.

There is a continuing need for a fuel cell system and method that optimizes a distribution of hydrogen during a start-up operation and militates against a voltage degradation of the fuel cell stack. Desirably, the fuel cell stack and method also minimizes hydrogen exhaust emissions during the start-up operation.

SUMMARY OF THE INVENTION

In concordance with the instant disclosure, a fuel cell system and method that optimizes a distribution of hydrogen, militates against voltage degradation, and minimizes hydrogen exhaust emissions during a fuel cell stack start-up operation is surprisingly discovered.

In one embodiment, a fuel cell system is provided including a fuel cell stack with a plurality of fuel cells. Each of the plurality of fuel cells has an anode and a cathode with an electrolyte membrane disposed therebetween. The fuel cell system includes an anode supply manifold in communication with the anodes of the plurality of fuel cells, the anode supply manifold adapted to deliver a anode supply stream to the plurality of fuel cells, and an anode exhaust manifold in communication with the anodes of the plurality of fuel cells, the anode exhaust manifold adapted to receive an anode exhaust stream from the plurality of fuel cells. The fuel cell system further includes a first valve in communication with the anode supply manifold and a second valve in communication with the anode exhaust manifold. In operation, the fuel cell system militates against a non-uniform distribution of the anode supply stream to the anodes of the plurality of fuel cells.

A method for starting a fuel cell system is also provided. The method includes providing the first valve in an open position, the first valve in communication with the anode supply manifold; providing the second valve in a closed position, the second valve in communication with the anode exhaust manifold; supplying an anode supply stream to the anode supply manifold; exhausting a first quantity of air from the anode supply manifold through the first valve; closing the first valve; opening the second valve; and exhausting a second quantity of air from the anodes of the plurality of fuel cells and the anode exhaust manifold through the second valve. The anode supply stream is thereby supplied substantially uniformly to the plurality of fuel cells of the fuel cell stack.

In a further embodiment, a fuel cell system is provided having a first fuel cell stack including a first plurality of fuel cells, a first anode supply manifold and a first anode exhaust manifold in communication with the first plurality of fuel cells, and a first valve in communication with the anode supply manifold. The fuel cell system also has a second fuel cell stack including a second plurality of fuel cells, a second anode supply manifold and a second anode exhaust manifold in communication with the second plurality of fuel cells, and a second valve in communication with the anode supply manifold. The fuel cell system further includes a third valve in communication with the first anode exhaust manifold and the second anode exhaust manifold, wherein the fuel cell system militates against a non-uniform distribution of the anode supply stream to the plurality of fuel cells of each fuel cell stack.

DRAWINGS

The above, as well as other advantages of the present disclosure, will become readily apparent to those skilled in the art from the following detailed description, particularly when considered in the light of the drawings described hereafter.

Figure 6:
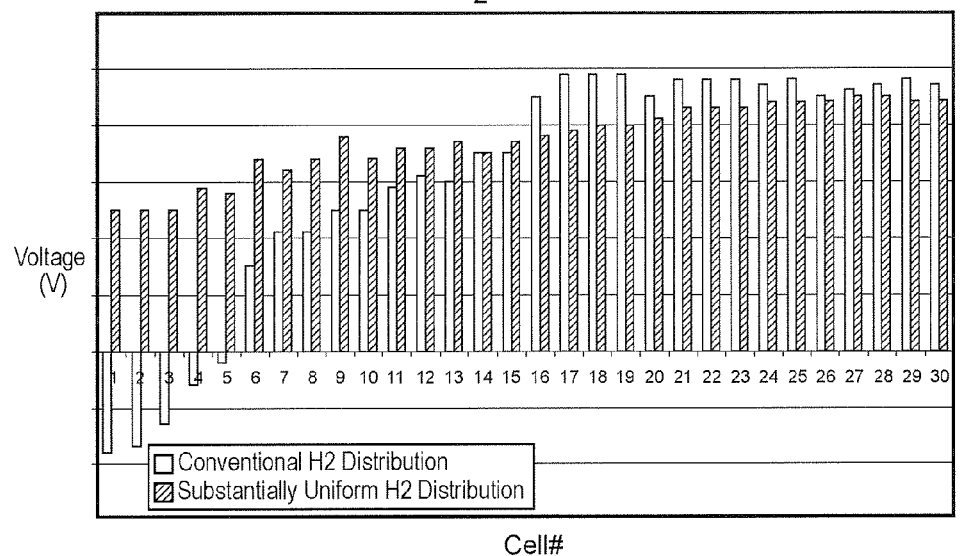
Figure 7:
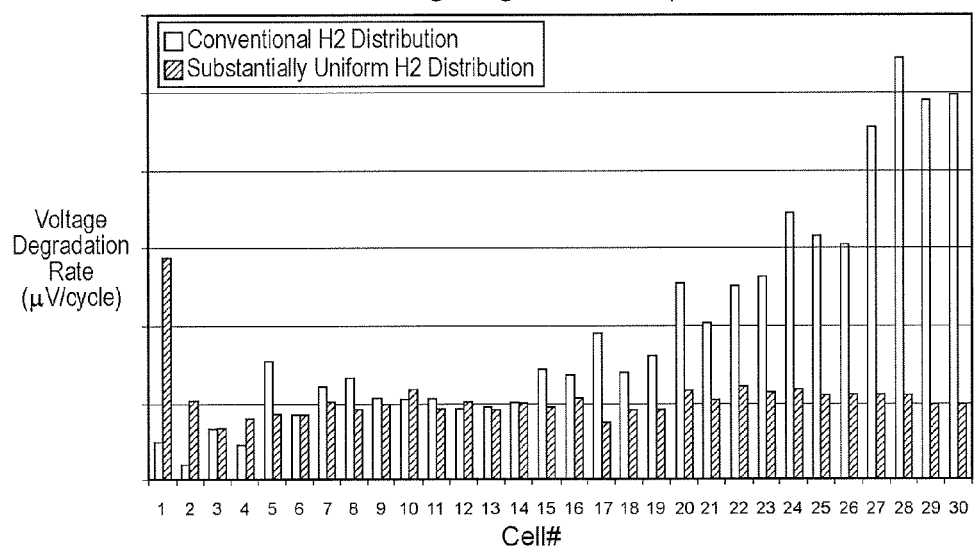

FIG. 6 is a bar graph illustrating fuel cell voltage as a function of location in a fuel cell stack for conventional hydrogen distribution and hydrogen distribution according to an embodiment of the present invention; and FIG. 7 is a bar graph illustrating voltage degradation as a function of location in a fuel cell stack for conventional hydrogen distribution and hydrogen distribution according to an embodiment of the present invention.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

Figure 1:
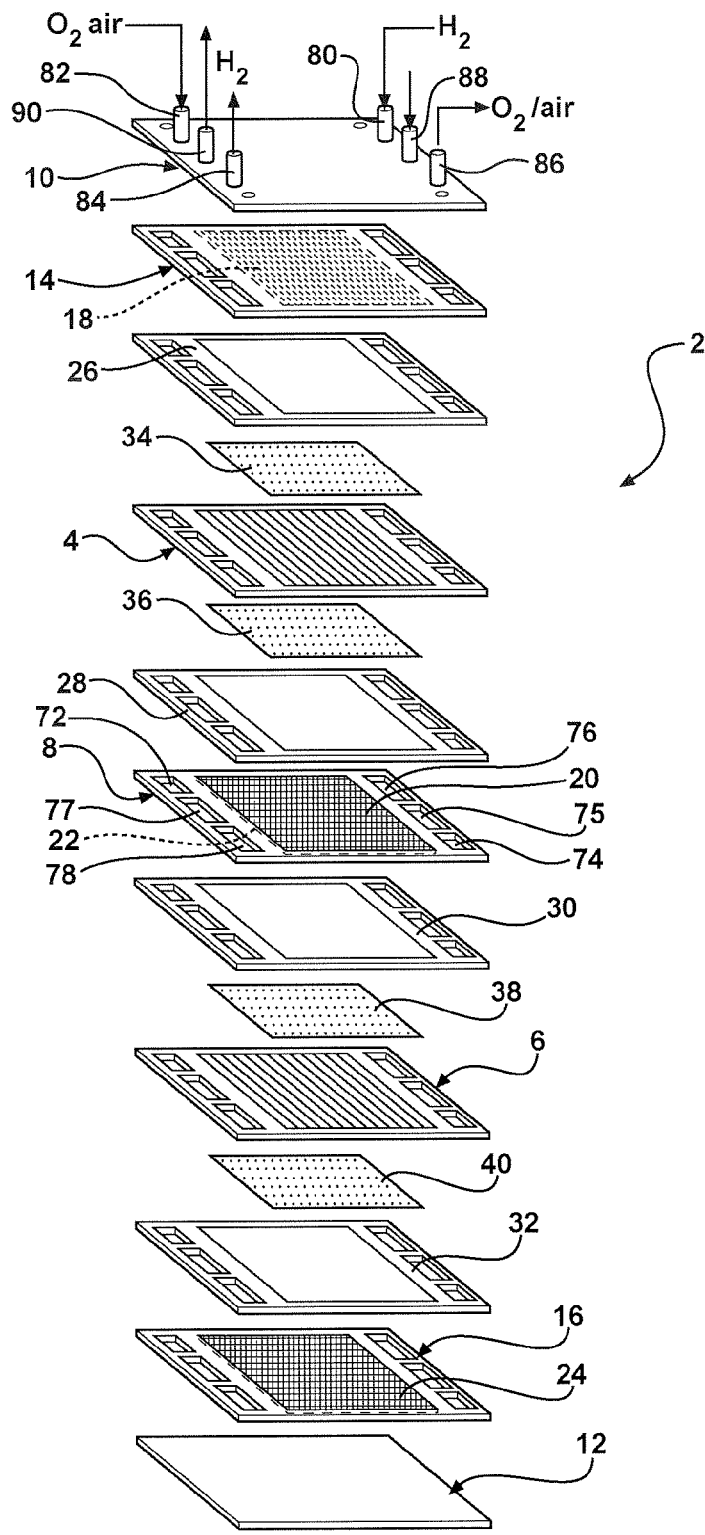
FIG. 1 illustrates a schematic, exploded perspective view of a PEM fuel cell stack (only two cells shown)

For simplicity, only a two-cell stack (i.e. one bipolar plate) is illustrated and described in FIG. 1, it being understood that a typical fuel cell stack will have many more such cells and bipolar plates.

FIG. 1 depicts an illustrative two-cell, bipolar PEM fuel cell stack 2 having a pair of MEAs 4, 6 separated from each other by an electrically conductive bipolar plate 8. The MEAs 4, 6 and bipolar plate 8 are stacked together between a pair of clamping plates 10, 12, and a pair of unipolar end plates 14, 16. The clamping plates 10, 12 are electrically insulated from the end plates 14, 16 by a gasket or a dielectric coating (not shown). The unipolar end plates 14, 16, as well as both working faces of the bipolar plate 8, include a plurality of grooves or channels 18, 20, 22, 24 defining a flowfield for distributing fuel and oxidant gases (i.e., $H_2$ & $O_2$/air) over the faces of the MEAs 4, 6. Nonconductive gaskets 26, 28, 30, 32 provide seals and an electrical insulation between the several components of the fuel cell stack. Gas-permeable diffusion media 34, 36, 38, 40, e.g. carbon or graphite diffusion papers, abut an anode face and a cathode face of the MEAs 4, 6. The end plates 14, 16 are disposed adjacent to the diffusion media 34, 40 respectively, while the bipolar plate 8 is disposed adjacent to the diffusion media 36 on the anode face of MEA 4. The bipolar plate 8 is further disposed adjacent to the diffusion media 38 on the cathode face of MEA 6.

The illustrative two-cell, bipolar PEM fuel cell stack 2 further includes a cathode supply manifold 72 and a cathode exhaust manifold 74, a coolant supply manifold 75 and a coolant exhaust manifold 77, and an anode supply manifold 76 and an anode exhaust manifold 78. The supply manifolds 72, 75, 76 and the exhaust manifolds 74, 77, 78 are formed, for example, by a cooperation of apertures formed in the bipolar plate 8 with apertures formed in the gaskets 26, 28, 30, 32 and apertures formed in the end plates 14, 16. A hydrogen gas is supplied as an anode supply stream to the anode supply manifold 76 via an anode inlet conduit 80. An oxidant gas is supplied as a cathode supply stream to the cathode supply manifold 72 of the fuel cell stack 2 via a cathode inlet conduit 82. An anode outlet conduit 84 and a cathode outlet conduit 86 are also provided for the anode exhaust manifold 78 and the cathode exhaust manifold 74, respectively. A coolant inlet conduit 88 and a coolant outlet conduit 90 are provided for supplying liquid coolant to, and removing coolant from, respectively, the coolant inlet manifold 75 and the coolant outlet manifold 77. It should be understood that the configurations of the various inlets 80, 82, 88 and outlets 84, 86, 90 in FIGS. 1 to 4 are for the purpose of illustration, and other configurations may be chosen as desired.

Figure 2:
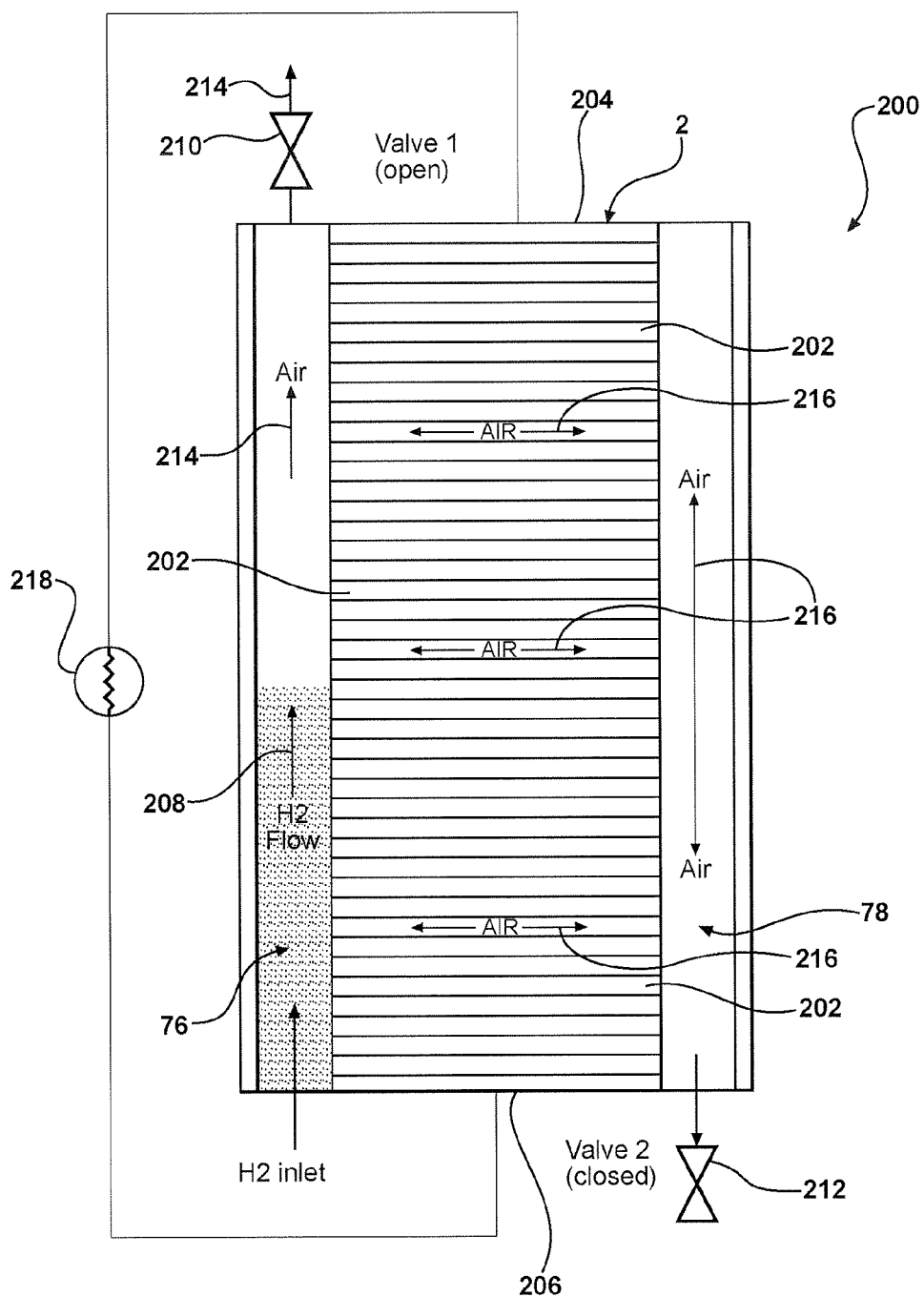
FIG. 2 is a side cross-sectional view of a fuel cell system (a plurality of cells shown) according to an embodiment of the present invention.

FIG. 2 shows a fuel cell system 200 according to an embodiment of the invention. The fuel cell system 200 includes the fuel cell stack 2 having a plurality of fuel cells 202. Each of the plurality of fuel cells 202 have an anode (not shown) and a cathode (not shown) with an electrolyte membrane (not shown) disposed therebetween. The fuel cell stack 2 further has a first end 204 and a second end 206. In particular embodiments, the first end 204 is known as the "dry end" and the second end 206 is known as the "wet end."

The fuel cell system 200 includes the anode supply manifold 76 in communication with the anodes of the plurality of fuel cells 202, the anode supply manifold 76 is adapted to deliver an anode supply stream 208, e.g. gaseous hydrogen, to the plurality of fuel cells 202. The fuel cell system 200 further includes an anode exhaust manifold 78 in communication with the anodes of the plurality of fuel cells 202. The anode exhaust manifold 78 is adapted to receive an anode exhaust stream (shown in FIG. 3), e.g. residual gaseous hydrogen, air, and water, from the plurality of fuel cells 202.

In a particular embodiment of the invention, the fuel cell system 200 includes a first valve 210 in communication with the anode supply manifold 76 and a second valve 212 in communication with the anode exhaust manifold 78. In one embodiment, the first valve 210 is disposed at the first end 204 of the fuel cell stack 2. The first valve 210 is adapted to exhaust a first quantity of air 214 and the anode supply stream 208 from the anode supply manifold 76. The second valve 212 is disposed at the second end 206 of the fuel cell stack 2. The second valve 212 is adapted to exhaust a second quantity of air 216 and an anode exhaust stream (shown in FIG. 3) from the anode exhaust manifold 78. In a further embodiment, the second valve 212 is disposed at the first end 204 instead of the second end 206. It should be understood that the fuel cell stack 2 may be supplied hydrogen as desired, and as long as the first valve 210 is disposed opposite the location of the hydrogen supply, for example.

It should be appreciated that when a sufficient period of time has elapsed between a shutdown operation of the fuel cell system 200 and a start-up operation, the first and second quantities of air 214, 216 will accumulate in the anode supply and exhaust manifolds 76, 78. Further, it should be appreciated that the first and second quantities of air 214, 216 will accumulate, during a sufficient period of stack inoperability, on the anodes of the plurality of fuel cells 202.

The fuel cell system 200 of the present disclosure may further have at least one resistive device 218 in electrical communication with the fuel cell stack 2. In particular embodiments, the resistive device 218 is a resistor. In further embodiments, the resistive device 218 is adapted to place a resistive load on the fuel cell stack 2 during startup, thereby militating against fuel cell degradation induced by carbon corrosion. A skilled artisan should understand that suitable resistive devices 218 may be used as desired.

In particular embodiments, the fuel cell system 200 includes at least one voltage sensor (not shown) adapted to measure a voltage of at least one of the plurality of fuel cells 202. Illustratively, the at least one voltage sensor is adapted to measure an average voltage of the plurality of fuel cells 202. Alternatively, the at least one voltage sensor is adapted to measure one or more individual fuel cells within the plurality of fuel cells 202.

In an illustrative embodiment, the fuel cell system 200 includes a controller (not shown). The controller may be adapted to actuate the first valve 210 and the second valve 212, thereby opening or closing the first valve 210 and the second valve 212 as desired. For example, the controller may receive a signal from the at least one voltage sensor indicating that anodes of the plurality of fuel cells 202 have a sufficient quantity of hydrogen present. In a further embodiment, the controller can include a control algorithm configured to process a number of variables such as, for example, a pressure of the anode supply stream 208, a volume of the anode supply manifold 76, and a size of the fuel cell stack 2, and can actuate the first and second valves 210, 212 as desired. It should be understood that alternative means can also be used to determine the presence of the anode supply stream 208 in the anodes or in the anode supply manifold 76, such as a time-based model of air permeation into the cathodes, for example.

In one embodiment, the fuel cell system 200 includes a compressor (not shown) in communication with the cathode inlet manifold 78. The compressor is adapted to supply a cathode supply stream (not shown) to the cathode inlet manifold 72. The cathode inlet manifold 72 is in fluid communication with the cathodes of the plurality of fuel cells 202. In a particular embodiment of the disclosure the fuel cell system 200 further includes a bypass valve (not shown) and bypass conduit (not shown) in fluid communication with the compressor. The bypass valve and conduit are adapted, for example, to allow the cathode supply stream to bypass the fuel cell stack 2 as desired. For example, it should be appreciated that the bypass conduit may be in fluid communication with the first valve 210 and the second valve 212 for dilution of hydrogen exhausted via the valves 210, 212.

As shown in FIG. 2, the present invention further includes a method for starting the fuel cell system 200. The method includes providing the first valve 210 in an open position and providing the second valve 212 in a closed position. The anode supply stream 208 is supplied to the anode supply manifold 76. While the first valve 210 is in the open position, a first quantity of air 214 is exhausted from the anode supply manifold 76 through the first valve 210. It should be appreciated that the first quantity of air 214 is caused to be exhausted due to the flow of the anode supply stream 208 into the anode supply manifold 76. The flow is also sufficiently low to minimize a distribution of the anode supply stream 208 into the anodes of the plurality of fuel cells 202 while the second valve 212 is in the closed position. It should be appreciated that the second valve 212 being in the closed position inhibits the distribution of the anode supply stream 208 into the anodes because the second valve 212 militates against an exhaust of the second quantity of air 216 while closed.

The method further includes closing the first valve 210 and opening the second valve 212, for example, when the anode supply stream 208 has substantially filled the anode supply manifold 76. It should be appreciated that closing the first valve 210 when the anode supply manifold 76 is substantially filled minimizes hydrogen emissions by militating against an exhaust of the anode supply stream 208, such as would occur with a hydrogen purge, for example. In further embodiments, the closing of the first valve 210 is simultaneous with the opening of the second valve 212.

Figure 3:
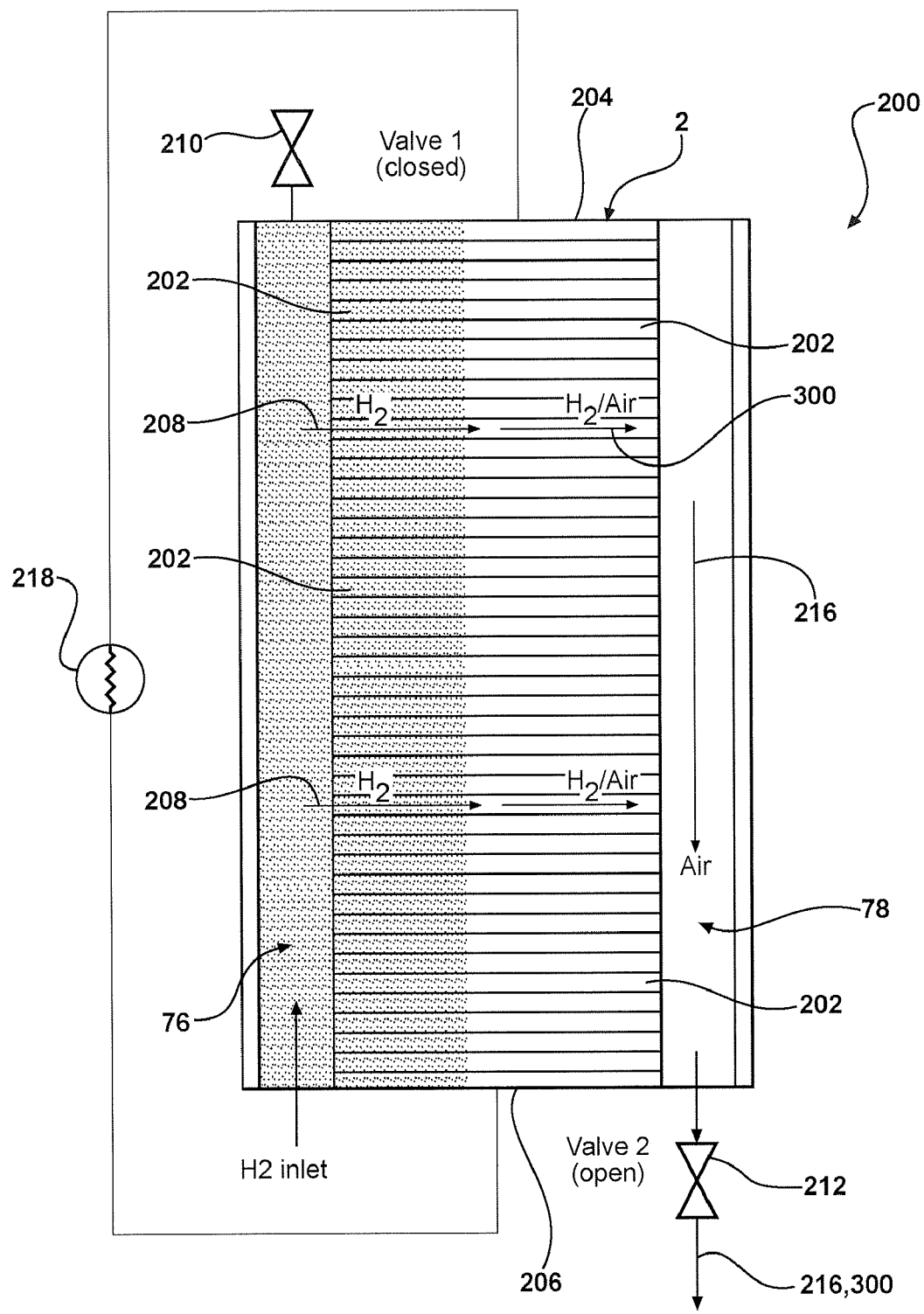
FIG. 3 is a side cross-sectional view of the fuel system depicted in FIG. 2, the fuel cell system uniformly distributing an anode supply stream to individual fuel cells.

As shown in FIG. 3, when the first valve 210 is closed and the second valve 212 is opened, the second quantity of air 216 is exhausted from the anodes of the plurality of fuel cells 202 and the anode exhaust manifold 78 through the second valve 212. It should be understood that the second quantity of air 216 is exhausted from the anode exhaust manifold 78 and the plurality of fuel cells 202 by the flow of the anode supply stream 208 being supplied to the plurality of fuel cells 202 and a flow of an anode exhaust stream 300 being exhausted from the plurality of fuel cells 202.

In operation, the anode supply stream 208 is supplied substantially uniformly to the plurality of fuel cells 202. The filling of the anode supply header 76 with the anode supply stream 208, while inhibiting a movement of the second quantity of air 216 from the anodes of the plurality of fuel cells 202 and the anode exhaust manifold 78, facilitates the substantially uniform supply and distribution of the anode supply stream 208. The substantially uniform supply and distribution occurs, for example, when the first valve 210 is closed and the second valve 212 is opened.

In a further embodiment of the present disclosure, the method includes measuring a voltage of at least one of the plurality of fuel cells 202. Illustratively, the voltage is measured with the at least one voltage sensor. The measured voltage may be used as an indicator of whether residual hydrogen, the anode supply stream 208, or the first or second quantities of air 214, 216 are present in anodes of the fuel cell stack 2. The measured voltage may also be used to actuate the first valve 210 and the second valve 212. For example, if the fuel cell system 200 has only been shutdown for a minimal period of time and there is still a predetermined concentration of hydrogen in the anodes of the plurality of fuel cells 202, then the first valve 210 is not opened. Illustratively, the first valve 210 is closed when an average voltage of the plurality of fuel cells 202 is greater than a predetermined maximum value, such as about 1.0 V. In particular embodiments, the first valve 210 is closed when the average voltage of the plurality of fuel cells 202 is greater than a maximum valve of about 0.6 V. In one embodiment, the first valve 210 is closed when the measured voltage of one of the plurality of fuel cells 202 is greater than about 0.1 V. It should be understood that other measured voltages may be used to actuate the first and second valves 210, 212 as desired. Furthermore, it should be appreciated that a different set of control diagnostics can be used as desired to determine a quantity of hydrogen present in the fuel cell stack 2.

The method of the present disclosure may further include supplying a cathode supply stream (not shown) to a cathode inlet manifold (not shown). The cathode inlet manifold is in communication with the plurality of fuel cells 202. In an illustrative example, the step of supplying the cathode supply stream is performed after supplying the anode supply stream 208 to the anode supply manifold 76, for example after the hydrogen purge is completed. In particular embodiments, if the cathode supply stream is desired to dilute the anode exhaust stream 300, the cathode supply stream may be bypassed around the cathodes. As an example, the anode exhaust stream 300 may be temporarily stored and then diluted following the hydrogen purge. As a further alternative, the excess hydrogen in the anode exhaust stream 300 is eliminated with a catalytic combustor, for example.

In a further embodiment, the cathode supply stream may be combined with the first or second quantities of air 214, 216 exhausted from the fuel cell stack 2. It should be appreciated that the step of combining the cathode supply stream with the first or second quantities of air 214, 216 is effective in diluting any quantity of hydrogen gas present in the first or second quantities of air 214, 216. In particular, the cathode supply stream can be allowed to bypass the fuel cell stack 2, for example with the bypass valve and conduit, where it can be used to dilute hydrogen gas present in the exhausted first and second quantities of air 214, 216. It should be appreciated that the concentration of hydrogen in the exhausted first and second quantities of air 214, 216 is less than a desired quantity, for example, about 4 percent.

Figure 4:
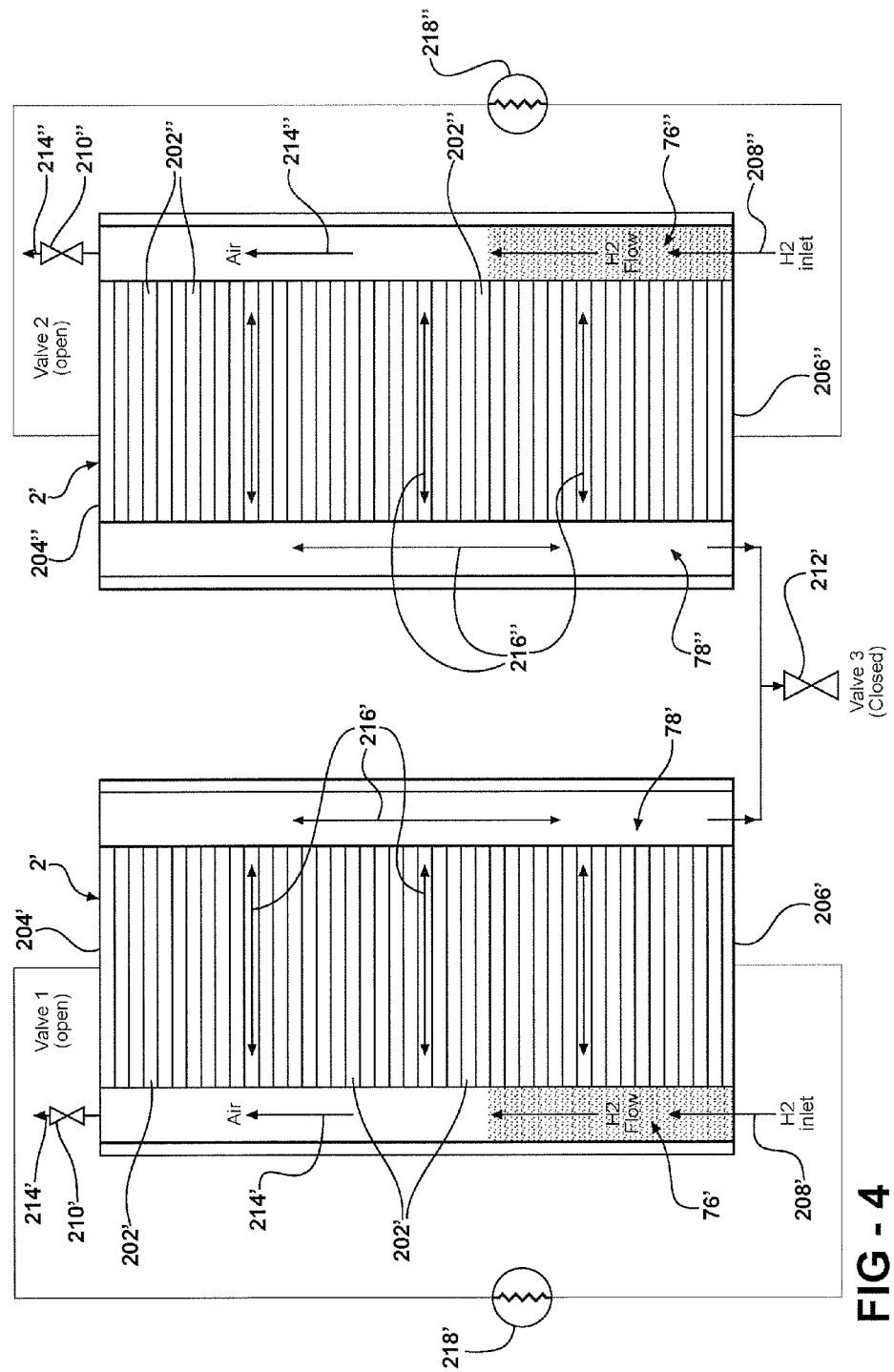
FIG. 4 is a side cross-sectional view of a dual-stack fuel cell system (a plurality of cells shown) according to an embodiment of the present invention.
Figure 5:
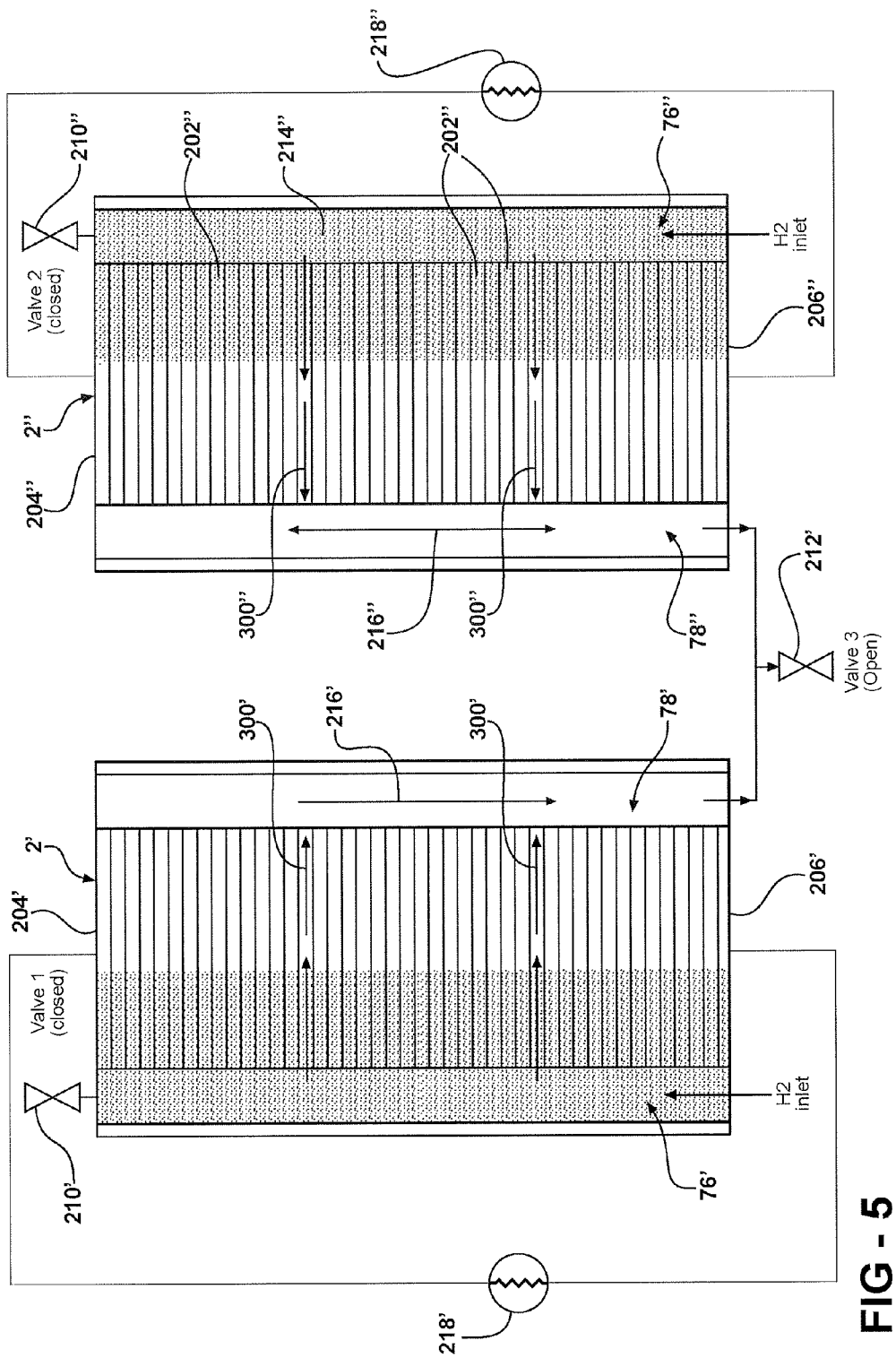
FIG. 5 is a side cross-sectional view of the dual-stack fuel cell system depicted in FIG. 4, the fuel cell system uniformly distributing an anode supply stream to individual fuel cells.

With reference to FIGS. 4 and 5, a further embodiment of the invention including a plurality of fuel cell stacks is described. For the purpose of clarity, like structures from FIGS. 2 and 3 have the same reference numerals and are denoted with a prime (') or double prime (") symbol.

As depicted FIG. 4, a fuel cell system 200' includes a first fuel cell stack 2' including a first plurality of fuel cells 202', a first anode supply manifold 76' and a first anode exhaust manifold 78' in fluid communication with the first plurality of fuel cells 202'. The first fuel cell stack 2' includes a first valve 210' in fluid communication with the anode supply manifold 76'. The first fuel cell stack 2' may have a first resistive device 218'.

The fuel cell system 200' further includes a second fuel cell stack 2" having a second plurality of fuel cells 202", a second anode supply manifold 76" and a second anode exhaust manifold 78" in fluid communication with the second plurality of fuel cells 202". The second fuel cell stack 2" includes a second valve 210" in fluid communication with the anode supply manifold 76". The second fuel cell stack 2" may have a second resistive device 218".

The dual-stack fuel cell system 200' also includes a third valve 212'. The third valve 212' is in fluid communication with the first anode exhaust manifold 78' and the second anode exhaust manifold 78" of the first and second fuel cell stacks 2', 2". As with the embodiment described in FIGS. 2 and 3, the fuel cell system 200' in operation militates against a non-uniform distribution of the anode supply stream to the plurality of fuel cells 202', 202" of each fuel cell stack 2', 2".

One of ordinary skill in the art should understand that the start-up method described herein may be employed with the fuel cell system having a plurality of fuel cell stacks. For example, the method includes providing the first valve 210' and the second valve 210" in an open position and providing the third valve 212' in a closed position. The anode supply stream 208', 208" is supplied to the anode supply manifolds 76', 76". While the first and second valves 210', 210" are in the open position, a first quantity of air 214', 214" is exhausted. The third valve 212', being in the closed position, inhibits the distribution of the anode supply stream 208', 208" into the anodes.

As shown in FIG. 5, the method further includes closing the first and second valves 210', 210" and opening the third valve 212', for example, when the anode supply streams 208', 208" have substantially filled the anode supply manifolds 76', 76". The closing of the first and second valves 210', 210" may be simultaneous with the opening of the third valve 212'. The opening of the third valve 212' facilitates an exhausting of the second quantity of air 216', 216" from the anodes of the fuel cell stacks 2', 2" and the anode exhaust manifolds 216', 216" during a start-up operation of the fuel cell system 200'.

It should be understood that the fuel cell system and method of the present invention provide a substantially uniform distribution of hydrogen to the anodes of the fuel cell stacks. As depicted in FIG. 6, it is now shown that the present fuel cell systems and methods inhibit cell reversal, particularly during a start-up operation of the fuel cell system 200. The individual fuel cells of the fuel cell stack receive hydrogen substantially uniformly and simultaneously during start-up with the present fuel cell system and method. This results in a substantially uniform voltage between individual fuel cells of the fuel cell stack in comparison to a conventional hydrogen distribution.

As shown by FIG. 7, a voltage degradation of the fuel cell system following repetitive start-up and shutdown operations is militated against with the fuel cell system 200 and method of the present invention. In particular, it is now surprisingly found that a rate of voltage degradation ($\mu V$/cycle) of the plurality of fuel cells 202 is optimized. In particular, a substantially uniform rate of voltage degradation between individual fuel cells employed in the fuel cell system 200 and method of the invention is observed in comparison to individual fuel cells having a conventional hydrogen distribution.

The present invention further optimizes hydrogen emissions on start-up by predicting when the stack anode has air or hydrogen upon a start-up operation, for example by measuring the voltage of the fuel cell stack 2. It should be appreciated that the hydrogen emissions are further minimized as the quantity of hydrogen present in the air exhausted from the second valve 212 is diluted, for example, with air from the compressor. The uniform distribution of hydrogen to the anodes reduces a mixing of hydrogen with air exiting the fuel cell stack 2 through the second valve 212, thus contributing to a lower hydrogen emission upon start-up.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for starting a fuel cell system, the fuel cell system including a fuel cell stack having a plurality of fuel cells, each of the plurality of fuel cells having an anode and a cathode with a electrolyte membrane disposed therebetween, the fuel cell stack having an anode supply manifold and an anode exhaust manifold in communication with the anodes of the plurality of fuel cells, the anode supply manifold disposed on a first side of the fuel cell stack and adapted to deliver an anode supply stream to the fuel cells, and the anode exhaust manifold disposed on a second side of the fuel cell stack and adapted to receive an anode exhaust stream from the fuel cells, the fuel cell system further including a first valve in fluid communication with the anode supply manifold, and a second valve in fluid communication with the anode exhaust manifold, a first quantity of air being present in the anode supply manifold and a second quantity of air being present in the anodes and the anode exhaust manifold prior to starting the fuel cell system, the method comprising the steps of:

providing the first valve in an open position, the first valve in the open position permitting the first quantity of air from the anode supply manifold to be exhausted therethrough;

providing the second valve in a closed position, the second valve in the closed position militating against a flow of the anode supply stream to the anodes;

supplying the anode supply stream to the anode supply manifold;

exhausting a first quantity of air from the anode supply manifold through the first valve in the open position, the first quantity of air displaced by the anode supply stream;

closing the first valve, the first valve in the closed position causing the anode supply stream from the anode supply manifold to flow to the anodes of the fuel cells;

opening the second valve, the second valve in the open position permitting the second quantity of air from the anodes and the anode exhaust manifold to be exhausted therethrough under pressure from the anode supply stream; and exhausting the second quantity of air from the anodes and the anode exhaust manifold through the second valve in the open position, the second quantity of air displaced by the anode supply stream, wherein the anode supply stream is supplied substantially uniformly to the plurality of fuel cells, and the individual fuel cells of the fuel cell stack receive the anode supply stream substantially simultaneously, thereby militating against a performance degradation of the fuel cell stack.

2. The method of claim 1, wherein the first valve is closed after the anode supply stream has substantially filled the anode supply manifold.

3. The method of claim 1, further comprising the step of: measuring a voltage of at least one of the plurality of fuel cells of the fuel cell stack.

4. The method of claim 3, wherein the first valve is closed when the voltage is above a predetermined maximum value.

5. The method of claim 1, further comprising the step of: supplying a cathode supply stream to a cathode inlet manifold in fluid communication with the plurality of fuel cells after supplying the anode supply stream to the anode supply manifold.

6. The method of claim 1, further comprising the step of: diluting a hydrogen gas with a cathode supply stream, the hydrogen gas present in at least one of the first quantity of air or the second quantity of air exhausted from the fuel cell stack.

7. The method of claim 1, wherein the first valve is closed and the second valve is opened substantially simultaneously.

8. The method of claim 1, wherein the exhausting of the first quantity of air and the second quantity of air is caused by a flow of the anode supply stream.

9. The method of claim 1, wherein the anode supply stream is supplied at a flow sufficient to minimize a distribution of the anode supply stream to the anodes prior to the opening of the second valve.

* * * * *